Figure 1:
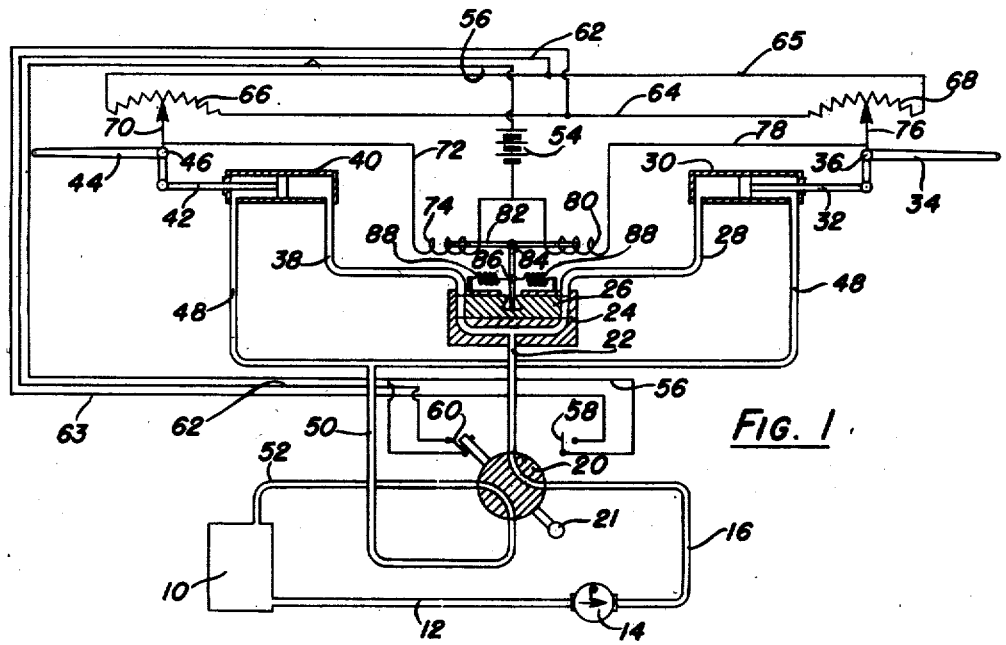

June 19, 1945.    J. P. PHILLIPS    2,378,497
EQUAL MOVEMENT SYSTEM
Filed Dec. 10, 1942

INVENTOR.
JOHN P. PHILLIPS
BY H. W. Brelsford
ATTORNEY

Patented June 19, 1945

2,378,497

UNITED STATES PATENT OFFICE 2,378,497

EQUAL MOVEMENT SYSTEM

John P. Phillips, North Hollywood, Calif., assignor, by mesne assignments, to Bendix Aviation Corporation, South Bend, Ind., a corporation of Delaware Application December 10, 1942, Serial No. 468,505

3 Claims. (Cl. 172—293)

This invention relates to means for equalizing movement of two motors, and more particularly to an electrically controlled equalizer valve for fluid pressure power systems.

There are many applications where it is desirable to move two or more motors at substantially the same speed when a mechanical interlock is not practicable. For example, on airplanes, both flaps must be lowered and raised at the same rate to maintain the aerodynamic balance of an airplane. The present invention may therefore be used an airplane flaps, replacing the complicated cable interlock now used when separate fluid or electrical motors are used.

It is an object of the invention to provide means to equalize movement between two or more motors.

It is another object to provide an exact equalizer valve for fluid power systems.

It is another object to provide an equalizer for fluid power systems which operates effectively on both pressure flow and upon exhaust flow.

Still another object of the invention is to provide an electrically controlled equalizer valve for fluid power systems.

Figure 2:
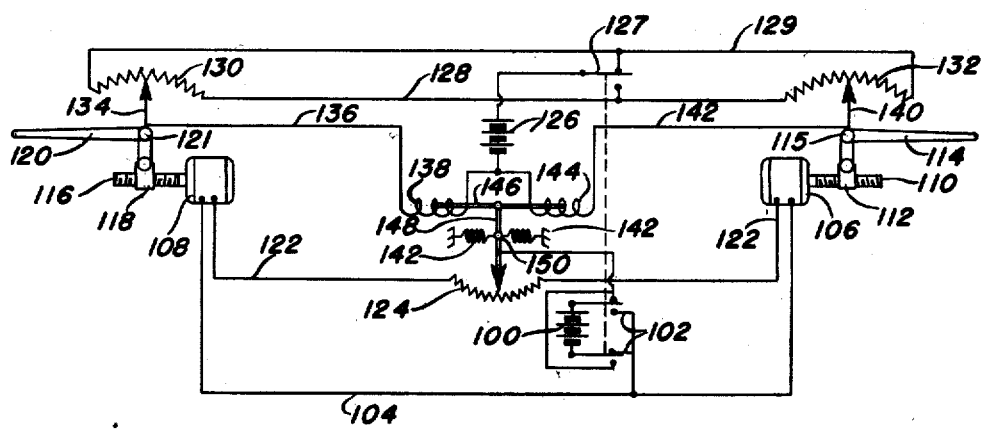

In the drawing forming a part of this specification:

Figure 1 is a schematic view of a fluid power system for operating the flaps of an airplane, which system incorporates the invention; and Figure 2 is a schematic view of an electric power system for operating the flaps of an airplane, which system incorporates the invention.

Referring to Figure 1, a reservoir 10 holds hydraulic or gaseous fluid under atmospheric pressure, which fluid passes through a conduit 12 to a power driven pump 14 which delivers its output to a tube 16 leading to a four-way valve 20 manually operated by a handle 21. In the position of valve 20 as shown, fluid under pressure is delivered into a conduit 22 leading to an equalizer valve 24 having a metering piston 26 slideable therein. Equalizer valve 24 has two outlets, one connected to a right hand conduit 28 leading to one end of a double acting power cylinder 30 having a piston and rod 32 connected to an airplane flap 34 pivoted at 36. A left hand outlet of equalizer valve 24 is connected to a conduit 38 leading to one end of a double acting power cylinder 40 having a piston and rod 42 connected to a second airpane flap 44 pivoted at 46. The opposite ends of cylinders 30 and 40 lead into a conduit 48 connected by tube 50 to the four-way valve 20, and in the position shown conduits 48 and 50 deliver an exhaust fluid through four-way valve 20 and a conduit 52 to reservoir 10.

The electric circuit of Figure 1 includes a battery 54 supplying current through a wire 56 to two switches 58 and 60 at the four-way valve 20. These switches are normally open, but when the four-way valve 20 is operated from a neutral position to one of the two operating positions, one or the other of these switches is closed. Switch 60 passes current from wire 56 to a wire 62 connected to a wire 65. Switch 58 passes current from wire 56 to a wire 63 connected to a wire 64 also near battery 54. Adjacent to flap 44 is an arcuate resistance 66, the inner end of which is connected to one end of wire 64. The other end of wire 64 is connected to the inner end of an arcuate resistance 68 adjacent to flap 34. The outer ends of resistances 66 and 68 are connected to wire 65. A movable contact 70 is connected to flap 44 and driven thereby and has electric connection through a wire 72 and a solenoid 74 back to the negative side of battery 54. Flap 34 drives a similar movable contact 76 electrically connected by a wire 78 and solenoid 80 to the negative side of battery 54 also. A magnetically attracted rod 82 is placed in solenoids 74 and 80 and has pivoted thereto a rocker arm 84 pivoted at 86 and held in a neutral position by centering springs 88. Rocker arm 84 moves metering piston 26 one way or the other, depending upon the relative strength of solenoids 74 and 80.

In operation, if the pilot desires to raise his flaps he operates manual valve 20 to the position shown, causing fluid under pressure to flow through equalizer valve 24 and into the inner ends of actuating cylinders 30 and 40. This movement also closes switch 60, passing current to wire 62 and thence to wire 65. The fluid forces piston rods 32 and 42 respectively outwardly, causing the flaps 34 and 44 to rotate about their respective pivots. If due to mechanical friction or aerodynamic differences in loading, one flap advances faster than the other, the resistance will be increased in the effective circuit of the solenoid 74 or 80 of the faster flap, causing a greater current in the slower flap circuit. This will draw rod 82 towards that solenoid, shifting metering piston 26 in a direction to limit fluid flow to the faster actuating cylinder. The faster actuating cylinder is thus stopped or slowed in its movements until the other actuating cylinder reaches the same relative position, at which time the electric forces on armature 82 are equalized and centering springs 88 return rocker arm 84 to its neutral position.

It will be noted that the electric control of metering piston 26 operates effectively on exhaust flow also. The flow is reversed by rotating manual handle 21 ninety degrees in a clockwise movement, opening switch 60 but closing switch 58 so that the current is passed to wire 64. Here again the faster flap will have the greater resistance in its circuit, operating the valve. When the flaps are not being operated, the valve 20 is in a neutral position, at which point neither switch 60 nor 58 is closed and no current is wasted in the equalizing system.

The system of Figure 2 is similar to that of Figure 1 except that electric motors are used instead of hydraulic motors as the power source. A battery 100 has both terminals connected to a two-way switch 102 which may alternatively connect a wire 104 leading to electric motors 106 and 108 to either the positive or negative side. Motor 106 has a threaded shaft 110 on which a threaded rider 112 is moved, which drives flap 114 pivoted at 115. Electric motor 108 has a similar threaded shaft 116 with a threaded rider 118 driving a flap 120 pivoted at 121. The electric circuit to motors 106 and 108 is completed by a wire 122 having an arcuate resistance 124 placed therein.

The control circuit includes a battery 126 having one terminal connected to a switch 127 which connects the battery to either a wire 128 or a wire 129 having circular resistances 130 and 132 connected at either end. Flap 120 has a takeoff 134 connected thereto and electrically connected by a wire 136 and solenoid 138 to the negative side of battery 126. Flap 114 has a pointer 140 connected by a wire 142 and solenoid 144 to the negative end also of battery 126. A floating armature 146 is placed in solenoids 138 and 144 and is pivoted to a pointer arm 148 pivoted at 150 and held in a neutral position by centering springs 142. The other end of switch 102 is connected to pointer 148 and the pointer in turn contacts semi-circular resistance 124. It will be noted that switches 102 and 127 are mechanically interconnected to act together.

To operate the flaps of Figure 2, the pilot moves switch 102 (and likewise switch 127) to one position or the other, causing the motors to rotate and the flaps 120 and 114 to move. If one flap gets ahead of the other it will draw a larger (or smaller) current than the other, which is reflected in solenoids 138 and 144. When the solenoids are unbalanced they cause armature 146 to move, moving pointer 148 and increasing the amount of resistance in the circuit of the faster motor, slowing that motor until the other motor assumes a similar relative position. Thus, the circuit described can be used to control an electric source as well as a hydraulic or pneumatic source of power.

Although this invention has been described with reference to flaps on an airplane it is not limited to such a narrow application, since this was done for purposes of illustration only, nor is the application limited in any other way except by the terms of the following claims:

I claim:

1. A power system comprising: a pair of reversible motors, electrically operated equalizer means to equalize the speeds of the motors, variable resistor means operated in accordance with the operative positions of said motors to control the equalizer means, each variable resistor means comprising a pair of end terminals and a tap terminal, and means operated by movement of the associated motor to inversely vary the resistances between the tap terminal and the respective end terminals, said tap terminals being connected to said equalizer means, means to deliver electric current to either end terminal of each variable resistance means and through the tap terminals to said equalizer means, and switch means dependent upon the direction of operation of said motors for supplying current to one or the other of the end terminals of said resistance means.

2. A power system comprising: a pair of reversible motors, equalizer means to equalize the speeds of the motors, variable resistor means operated by the operative positions of said motors to control said equalizer means, each variable resistor means comprising end terminals and a tap terminal and means operated by movement of the associated motor to inversely vary the resistances between the tap terminal and the respective end terminals, means to deliver electric current to either end of said resistor means and through the tap terminals of said resistor means to said equalizer means, switch means dependent upon the direction of operation of said motor for supplying current to one or the other end terminals of said resistor means, and means to cut off all current to said resistor means when said motors are not being operated.

3. In a power system having a pair of motor devices to be operated in unison, electrically operated means to vary the relative speeds of the two motor devices, said means having two windings and being responsive to departure of the currents therein from a predetermined ratio to vary the relative speeds of said motor devices, a pair of variable resistors one associated with each motor device and driven thereby to vary its resistance to an extent corresponding to the extent of movement of the motor device, means for supplying current to one of said windings through one resistor and to the other winding through the other resistor, said resistors being varied in the same sense by movement of said motor devices whereby the currents in the two windings vary with movements of the motor devices in the same ratio during equal movements of the two motor devices but depart from said ratio in response to unequal movements of the motor devices to accelerate the motor of lesser movement and retard the motor device of greater movement.

JOHN P. PHILLIPS.